(12) United States Patent
Knight, Jr. et al.

(10) Patent No.: US 10,350,511 B1
(45) Date of Patent: Jul. 16, 2019

(54) DISTILLATION REFLUX REDUCTION

(71) Applicant: Bioleap, Inc., Tampa, FL (US)

(72) Inventors: James Knight, Jr., Tampa, FL (US); Olan Wayne Mitchell, Cape Coral, FL (US)

(73) Assignee: BIOLEAP, INC., Tampa, FL (US)

( * ) Notice: Subject to any disclaimer, the term of this patent is extended or adjusted under 35 U.S.C. 154(b) by 0 days.

(21) Appl. No.: 15/643,594

(22) Filed: Jul. 7, 2017

Related U.S. Application Data

(60) Provisional application No. 62/362,828, filed on Jul. 15, 2016.

(51) Int. Cl.
*B01D 3/36* (2006.01)
*B01D 3/42* (2006.01)
*B01D 3/00* (2006.01)
*B01F 5/04* (2006.01)

(52) U.S. Cl.
CPC .............. *B01D 3/36* (2013.01); *B01D 3/001* (2013.01); *B01D 3/4205* (2013.01); *B01F 5/043* (2013.01); *Y02E 50/17* (2013.01)

(58) Field of Classification Search
CPC ........ B01D 3/001; B01D 3/4205; B01D 3/36; B01F 5/043; C12P 7/06; Y02E 50/16; Y02E 50/17; C12G 3/12
See application file for complete search history.

(56) References Cited

U.S. PATENT DOCUMENTS

| 1,459,699 | A | * | 6/1923 | Van Ruymbeke | ..... B01D 3/001 203/19 |
| 2,381,996 | A | | 5/1942 | Bloomer | |
| 5,980,698 | A | * | 11/1999 | Abrosimov | .............. B01D 3/10 196/114 |
| 6,398,918 | B1 | * | 6/2002 | Popov | ...................... B01D 3/10 203/100 |
| 8,053,610 | B2 | * | 11/2011 | Kikuchi | .................. C07C 29/76 568/913 |
| 9,989,310 | B2 | * | 6/2018 | Knight, Jr. | ............ F26B 25/007 |

(Continued)

FOREIGN PATENT DOCUMENTS

| GB | 455947 | * | 10/1936 | ............. B01D 3/003 |
| GB | 823339 | * | 11/1959 | ........... B01D 1/2856 |

(Continued)

OTHER PUBLICATIONS

WO2007102751_ENG (WIPO machine translation of Abrosimov) (Year: 2007).*

*Primary Examiner* — Youngsul Jeong
*Assistant Examiner* — Gabriel E Gitman
(74) *Attorney, Agent, or Firm* — Beusse Wolter Sanks & Maire; David G. Maire

(57) ABSTRACT

An improvement which reduces the reflux requirement for a fractional distillation system of an alcohol production plant (40, 60, 70, 80). The improvement includes a mixing device (44) for combining a water/alcohol mixture having an enhanced alcohol content (50, 62, 72, 82) with the reflux liquid (16) in the absence of a vapor/liquid equilibrium interface to form a reflux mixture (56) for supply to the rectifier column (14). The mixture having an enhanced alcohol content may be sourced from a location along the rectifier-reflux vapor to liquid system flow path, or from another source.

4 Claims, 3 Drawing Sheets

(56) References Cited

U.S. PATENT DOCUMENTS

2010/0055753 A1\* 3/2010 Geros .................... C07C 29/88
  435/165
2010/0294642 A1\* 11/2010 Datta ........................ C07C 1/24
  201/2.5

FOREIGN PATENT DOCUMENTS

| WO | WO2007102751 | \* | 9/2007 | ............... B01D 3/10 |
| WO | WO2008024109 | \* | 2/2008 | ............. C07C 29/80 |

\* cited by examiner

DISTILLATION REFLUX REDUCTION

This application claims benefit of the 15 Jul. 2016 filing date of U.S. provisional application No. 62/362,828.

FIELD OF THE INVENTION

This invention relates generally to distillation processes, and more particularly to the reduction of the amount of reflux used in a fractional distillation process, and in one embodiment to the reduction of the amount of reflux liquid used in a grain alcohol plant.

BACKGROUND OF THE INVENTION

In a typical fuel grade ethanol production process such as may be used in a corn ethanol plant, beer having a concentration of ethanol that is usually no more than approximately 15% by volume is directed to a distillation process where the ethanol in the beer is extracted in a fractional distillation system. Distillation columns typically have a multitude of horizontal trays for bringing rising ethanol vapor and descending liquid into contact. In a distillation column, low pressure steam percolates up through the beer as the beer cascades from higher trays to lower trays. As the rising steam heats the beer, the ethanol in the beer evaporates and rises to the top of the column where it exits as an overhead vapor. The remaining water and other grain material in the beer descends to the bottom of the column to exit as beer bottoms.

To produce fuel grade ethanol, more than one interconnected distillation column is normally used to progressively purify the ethanol product. In a typical ethanol distillation process, a beer column receives beer and produces an intermediate ethanol vapor. A rectifier column receives the intermediate ethanol vapor from the beer column and produces 190 proof (95% pure) ethanol vapor. A third, side stripper column receives rectifier bottoms from the rectifier column and produces an intermediate ethanol overhead vapor that is further purified by the rectifier column. Because ethanol and water form an azeotropic mixture, an extractive distillation process can only practically produce an ethanol water distillate that is approximately 95% ethanol and 5% water.

Reflux is the portion of the overhead vapor product from a distillation column that is returned as liquid to the upper part of the column in order to improve the separation of the lower boiling temperature material from the higher boiling temperature material. The more reflux provided to an ethanol rectifier column, the higher proof ethanol vapor will be produced by the rectifier, limited only by the azeotrope. However, the recycled reflux flow reduces the product output ("capacity") of the rectifier column.

A dehydrator may be used downstream of an ethanol/water rectifier column to remove additional water from the overhead vapor in order to produce a higher purity product. The dehydrator may receive 95% ethanol vapor from the rectifier column and may remove nearly all of the remaining water to produce ethanol having a water content of less than 0.25%. Typically, a dehydrator contains beads of material which attract water to a greater degree than ethanol, or it contains a water permeable membrane that preferentially passes water across the membrane and simultaneously limits the passage of ethanol across the membrane.

Reflux is routinely used in the fractional distillation of both azeotropic as well as non-azeotropic mixtures. Reflux is used to reduce the number of theoretical trays necessary to obtain a target purity of distillate. In practice, an economic evaluation is conducted when designing a distillation system which takes into account both capital costs, such as the design size of the columns, and operating costs, such as the corresponding amount of reflux required for a given design.

For minimum-boiling azeotropic mixtures, such as ethanol and water, the operating line for the rectifying section of distillation has a "sway-back" at high concentrations on its Vapor Pressure Equilibrium (VLE) curve. To get a minimum-boiling azeotropic mixture such as ethanol and water close to its azeotrope, the slope of the operating line must be increased to almost 45 degrees. This requires increasing the amount of reflux liquid until it almost equals the amount of vapor flowing up through the column, thereby increasing the reflux ratio sharply. This procedure significantly limits the amount of product produced in a column of a given diameter, since most of the condensed vapors have to be recycled back to the rectifier column as reflux liquid. Consequently, it takes about twice as much energy to produce a gallon of 95 weight percent ethanol as it does to produce a gallon of 85 weight percent ethanol.

In a fractional distillation process for a minimum-boiling azeotropic mixture such as ethanol and water, the top tray of the rectifier column typically has a concentration that is close to, but lower than, the mixture's natural azeotrope. The overhead vapor from the top tray of a rectifier has a composition more near the natural azeotrope than the liquid on that top tray due to the physical properties of the azeotropic components. Subsequently, the overhead vapor is condensed and subcooled to produce liquid distillate. Because of the physical properties of an azeotropic mixture, the subcooled distillate typically has a concentration inferior to that of the overhead vapor, but superior to the concentration on the top tray of the rectifier. A portion, typically more than fifty percent (50%), of the subcooled distillate is recycled back to the top tray of the rectifier as reflux and the remainder is withdrawn as distillate product.

To date, there has been limited success in reducing the quantity of reflux necessary in the fractional distillation of a minimum-boiling azeotropic mixture. One approach that has been used is illustrated in FIG. 1. In a fuel ethanol production plant 10, a portion of an overhead vapor 12 produced in a rectifier column 14 is recycled back to the rectifier column 14 as reflux liquid 16. In order to reduce the quantity of reflux liquid needed, a high proof vapor 18, such as may be sourced downstream of a dehydration process (not shown) of the same plant 10, is recycled back to the rectifier column 14 in combination with overhead vapor 12. The overhead vapor 12 has a composition below its natural azeotrope. The high proof vapor 18 and overhead vapor 12 mix together to form a vapor mix 30 which is condensed in an indirect contact condenser 20, producing a subcooled distillate mixture 22 which in turn is directed to a distillate collection vessel 24 and circulated by pump 26. This subcooled distillate mixture 22 is of superior composition than what would otherwise be produced without the addition of the high proof vapor 18, thereby reducing the volume of reflux liquid 16 that is needed to achieve a target purity in the overhead vapor 12. Part of the superior subcooled distillate mixture 22 is withdrawn as distillate product 28 and directed to the dehydration process.

Most other work to date for decreasing the reflux requirement or improving the fractional distillation of azeotropic mixtures involves the use of entrainers which alter the thermodynamic relationship between azeotropic constituents. Entrainers have been used successfully across a wide variety of industries, but they add cost, may be difficult or dangerous to handle, and ultimately must be removed from the final product stream. Thus, other solutions for reducing the reflux requirement are desired.

BRIEF SUMMARY OF THE INVENTION

Embodiments of the present invention may combine an enriched fluid (e.g. a mixture having a higher content of the desired constituent than does the reflux liquid) with the reflux liquid at a location upstream of the rectifier column but downstream of any liquid/vapor equilibrium interface, and downstream of any diversion of fluid away from the rectifier column. This results in a most efficient use of the enriched fluid, whether it is costly high proof vapor sourced from a dehydrator, or it is a fluid taken from elsewhere in the reflux fluid loop. The present invention allows for a reduction in the amount of reflux used to obtain a target separation when compared to the prior art method of FIG. 1, thereby reducing the energy consumed in the process.

In one embodiment, rectifier overhead vapor sourced from anywhere upstream of the condenser vapor/liquid interface is mechanically forced into direct contact with the portion of the subcooled distillate destined as reflux, at a location upstream of the rectifier column and downstream of any diversion of fluid away from the rectifier column, and also downstream of any vapor/liquid interface, by use of a mixing device such as an eductor. The subcooled liquid reflux, having an inferior composition than the overhead vapor, is fed into the motive inlet of the eductor at a pressure sufficient to produce a target pressure on the suction side of the eductor. In accordance with Bernoulli's principle, as the liquid passes through the eductor, an area of low pressure is produced on the suction side of the eductor where overhead vapor from the rectifier is educed into direct contact with the liquid. The speed at which the vapor and liquid pass through the mixing chamber of the eductor reduces opportunity for the liquid composition and vapor composition to equilibrate, thereby producing a mixture that is superior in concentration than the liquid feed but inferior in concentration than the overhead vapor. This phenomenon is due in part to (1) the positive impact from the momentum of the liquid and vapor; (2) the short duration and small contact area between liquid and vapor; and (3) the fact that much of the vapor is first trapped in microbubbles within the liquid before condensing, thereby reducing the opportunity for the liquid and vapor to equilibrate at the liquid-vapor interface inside the eductor. When the vapor condenses within the subcooled liquid, the temperature of the resulting mixture is greater than the temperature of the subcooled liquid feed in proportion to the quantity of enthalpy added by the overhead vapor. The initial impact of the superior mixture being introduced on the top tray of the rectifier is the production of a superior overhead vapor than what the overhead vapor was before the introduction of the superior reflux mixture. The superior overhead vapor produces a superior subcooled distillate, which in combination with the superior overhead vapor in the eductor, produces an ever superior reflux mixture. There is an arithmetic limit to the added benefit derived from this mechanical phenomena which is dependent on the system temperatures, reflux ratio, eductor performance, and other factors.

The advantage of this arrangement is substantial. Mechanically altering the composition of the reflux stream of a minimum-boiling azeotropic mixture, bringing it more near its natural azeotrope, necessary reduces the reflux ratio required in order to produce the same overhead vapor composition as without the mechanical action. The economic benefit of this arrangement is great when applied to real world applications. The mechanical energy is typically derived from an existing reflux pump 26, which typically discharges the subcooled distillate at a pressure greater than the minimum theoretical requirement. In practice, the excess pressure is reduced by use of a back pressure control device, such as a control valve (not shown in FIG. 1). Since most of the capital equipment is already installed and much of the necessary mechanical energy is already being generated and wasted, relatively little additional capital or energy is required to install and operate a system consistent with the present invention.

In another embodiment, a high proof fluid is mechanically forced into direct contact with the portion of the subcooled distillate destined as reflux at a location upstream of the rectifier column and downstream of any diversion of fluid away from the rectifier column, and also downstream of any vapor/liquid interface, by use of a mixing device. The high proof fluid may be a high proof vapor or a high proof liquid. The mixing device may be an eductor, liquid full vessel, or other mechanical device effective to mix the high proof fluid with the reflux distillate in the absence of a vapor/liquid equilibrium interface.

BRIEF DESCRIPTION OF THE DRAWINGS

The invention is explained in the following description in view of the drawings that show.

Similar components are numbered consistently in the various figures.

DETAILED DESCRIPTION OF THE INVENTION

Figure 1:
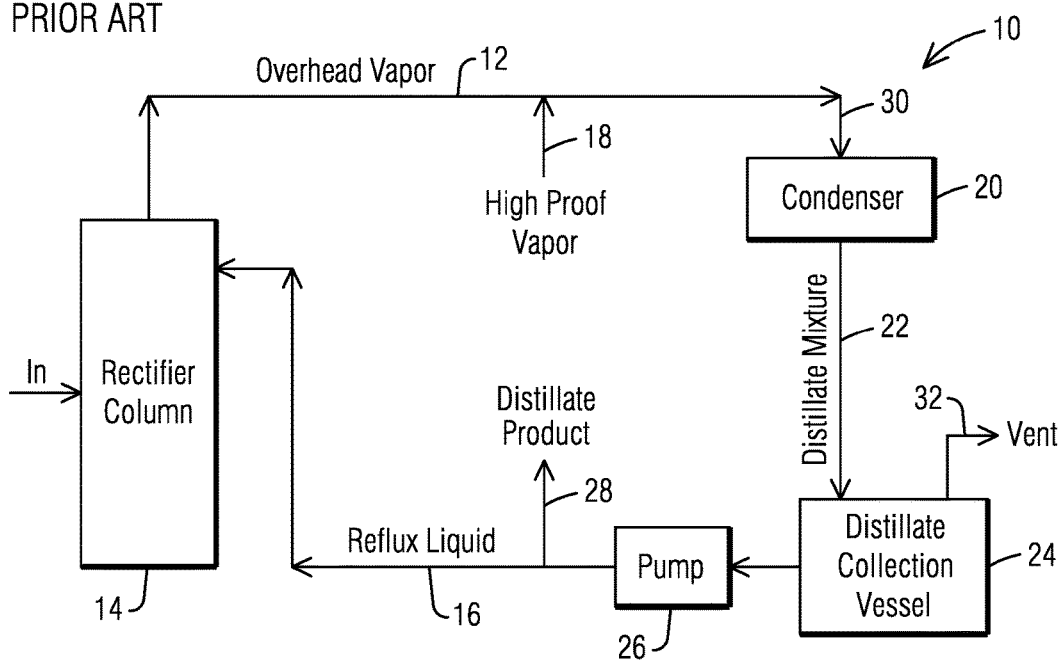
FIG. 1 is a process diagram of a prior art fractional distillation reflux configuration.

The present inventors have innovatively recognized several disadvantages with the prior art reflux configuration of FIG. 1.

First, while the mixing of the high proof vapor 18 with the overhead vapor 12 does provide a higher proof vapor mix 30 to the condenser 20, the resulting distillate mixture 22 will, by definition, be a lower proof composition than the vapor mix 30 due to the liquid/vapor interface existing within the condenser 20.

Second, the volume of vapor exiting the distillation system through the vent 32 is not affected by the addition of the high proof vapor 18, and the vapor vented will be superior in concentration than the vented vapor would be without the addition of the high proof vapor 18. Therefore, the vent 32 will discharge a relatively larger quantity of ethanol and a relatively lower quantity of water than would be vented if no high proof vapor 18 were introduced, and the addition of the high proof vapor 18 results in an increase in ethanol lost through the vent 32.

Third, the addition of the high proof vapor 18 serves to enrich both the reflux liquid 16 and the product distillate 28. In other words, a portion of the high proof vapor 18 contributes to the increase in superiority of the reflux 16, and a portion of the high proof vapor 18 contributes to the increase in superiority of the distillate product 28. There is a cost associated with producing the high proof vapor 18, and its extraction for use as reflux reduces the output of plant 10, but because some of that fluid simply returns to the dehydrator (not shown) as distillate product 28, the separation benefit derived by the addition of the high proof vapor 18 is diluted by the inverse of the reflux ratio. The present inventors have recognized that it would be more efficient to have all of the high proof vapor 18 contribute to the superiority of the reflux 16, thereby reducing the amount of high proof vapor needed and minimizing the opportunity cost inherent in the diversion of high proof vapor 18 away from the output of the plant 10.

Figure 2:
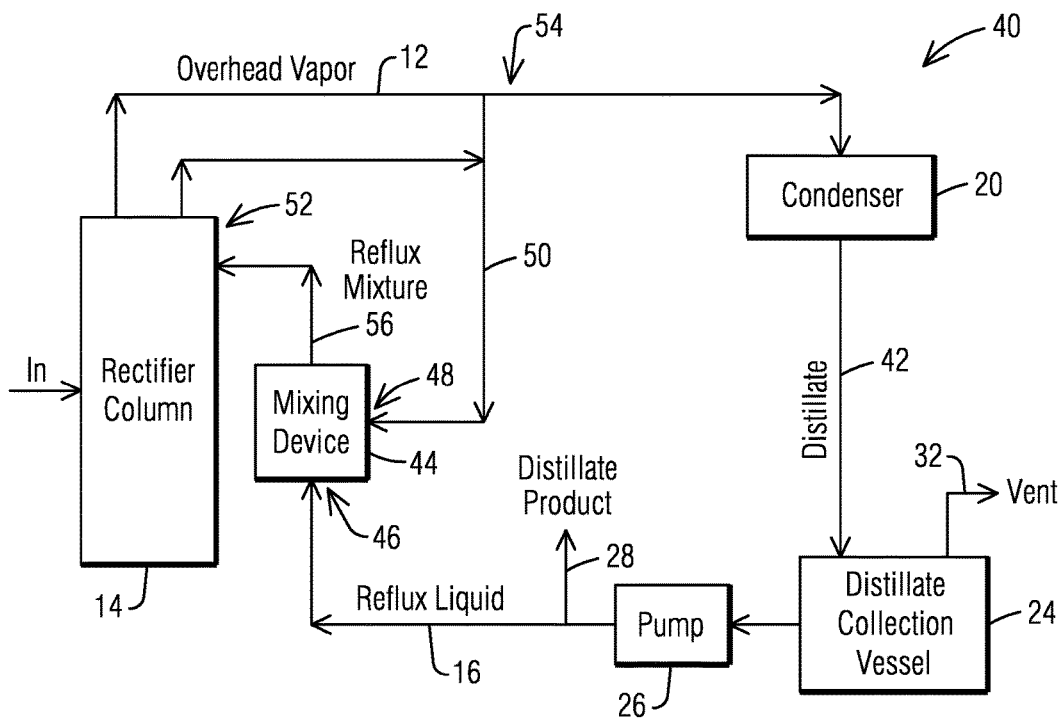
FIGS. 2-5 are process diagrams of fractional distillation reflux configurations in accordance with various respective embodiments of the invention.

One embodiment of the present invention which overcomes these disadvantages is illustrated in FIG. 2, where an improved fuel ethanol production plant 40 includes certain components which are similar to those illustrated in FIG. 1. A rectifier column 14 supplies overhead vapor 12 to a condenser 20, and the condenser 20 provides a distillate 42 to a distillate collection vessel 24. Liquid from a liquid region of the distillate collection vessel 24 is delivered by pump 26 for use as both distillate product 28, such as to a downstream dehydrator (not shown), and as reflux liquid 16 for recycle to the rectifier column 14. In addition, the plant 40 includes a mechanical mixing device 44, such as an eductor. In other embodiments, the mixing device may be a sparger, a siphon, an exhauster, a venturi nozzle, a jet, an expander, or an injector, for examples. The mixing device 44 may have a motive inlet 46 receiving the reflux liquid 16 and a suction inlet 48 receiving a reflux portion 50 of the overhead vapor 12. The reflux portion 50 of the overhead vapor 12 may be sourced from either the top section 52 of the rectifier column 14, and/or from the conduit/piping 54 interconnecting the rectifier column 14 and the condenser 20, both sources having functionally identical compositions, and both being water/alcohol mixtures having a higher alcohol content than either the distillate 42 or the reflux liquid 16. As the reflux liquid 16 travels through the mixing device 44, the reflux portion 50 of the overhead vapor 12 is educed into the suction side 48 of the mixing device 44. The subcooled reflux liquid 16 and reflux portion 50 of the overhead vapor 12 are turbulently and violently mixed inside the mixing device 44. Part of or all of the reflux portion 50 of the overhead vapor 12 condenses and mixes with the reflux liquid 16 to produce a reflux mixture 56 that is more near the mixture's natural azeotrope than is either the reflux liquid 16 or the distillate 42. A part of or preferably all of the reflux mixture 56 is subsequently directed to the top section 52 of the rectifier column 14 as reflux. The reflux portion 50 of the overhead vapor 12 is a water/alcohol mixture having a higher alcohol content than both the distillate 42 and the reflux liquid 16 due to the vapor/liquid interfaces existing in the condenser 20 and the distillate collection vessel 24. Note that there is no vapor/liquid interface existing between the mixing device 44 and the rectifier column 14, so the alcohol content of the reflux portion 50 of the overhead vapor 12 is undiminished. Moreover, the distillate product 28 is extracted upstream of the mixing device 44, so all of the alcohol of the reflux portion 50 is beneficially utilized as reflux.

Figure 3:
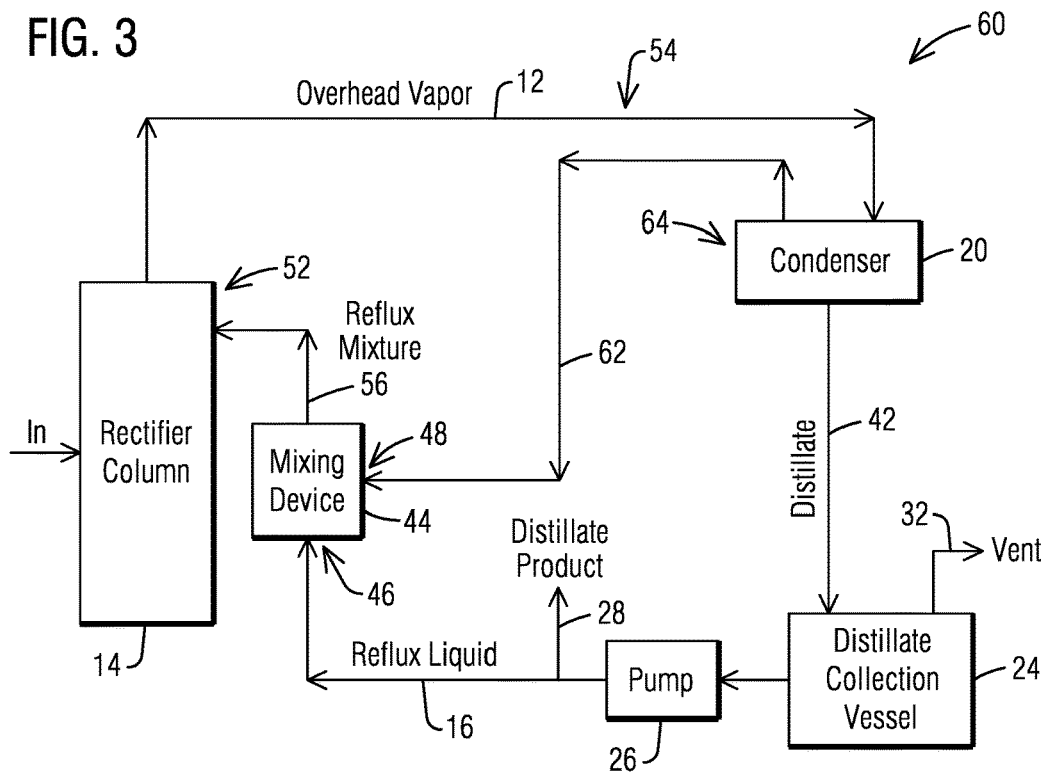

Another embodiment of the invention is illustrated in FIG. 3, where an improved fuel ethanol production plant 60 includes certain components which are similar to those illustrated in FIG. 2. As in FIG. 2, subcooled reflux liquid 16 is directed into the motive inlet 46 of a mixing device 44; however, in this embodiment, the suction inlet 48 of the mixing device 44 receives saturated overhead vapor 62, vapor that is in equilibrium with the distillate 42 inside the condenser 20, from a vapor side 64 of the condenser 20. As the reflux liquid 16 travels through the eductor 44, the saturated overhead vapor 62 is educed from the vapor side 64 of the condenser and into the suction side 48 of the mixing device 44. The reflux liquid 16 and saturated overhead vapor 62 are turbulently and violently mixed inside the mixing device 44 to produce a reflux mixture 56 that is more near the mixture's natural azeotrope than is the reflux liquid 16.

Figure 4:
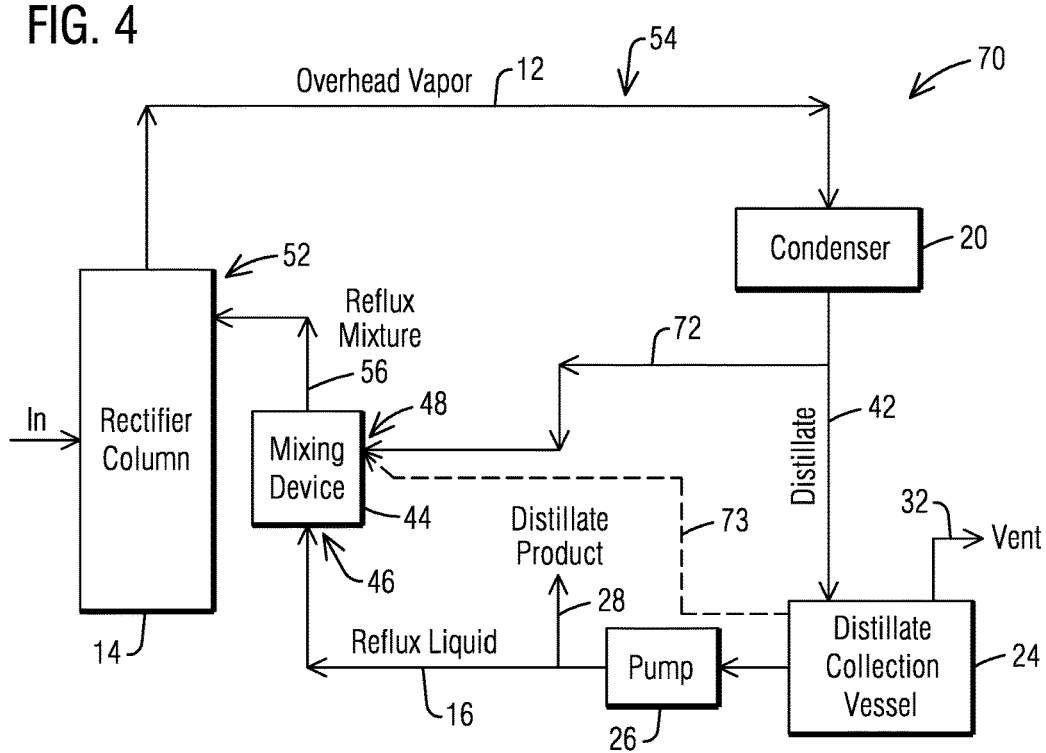

Another embodiment of the invention is illustrated in FIG. 4, where an improved fuel ethanol production plant 70 includes certain components which are similar to those illustrated in FIG. 2. As in FIG. 2, subcooled reflux liquid 16 is directed into the motive inlet 46 of a mixing device 44. However, in this embodiment, the suction inlet 48 of the mixing device 44 receives fluid from a point downstream of the condenser 20 and upstream of the liquid side of the distillate collection vessel 24, for example from the piping 72 interconnecting the condenser 20 and the distillate collection vessel 24, or via line 73 as shown in phantom from a vapor side of the distillate collection vessel 24. The reflux liquid 16 and fluid 72 are turbulently and violently mixed inside the mixing device 44 to produce a reflux mixture 56 that is more near the mixture's natural azeotrope than is the reflux liquid 16. It will be appreciated that any location along the rectifier-reflux vapor to liquid system flow path may be used as the source of fluid for the suction inlet 48 of the mixing device 44.

Figure 5:
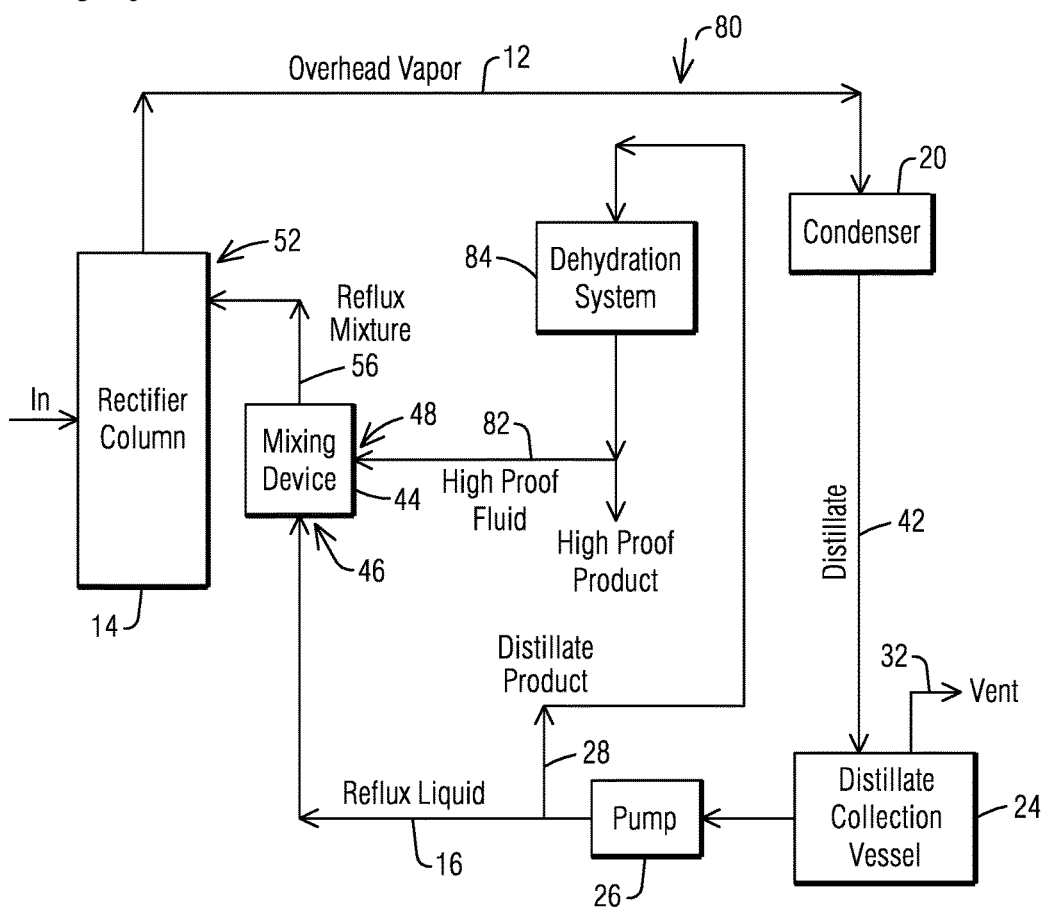

Another embodiment of the invention is illustrated in FIG. 5, where an improved fuel ethanol production plant 80 includes certain components which are similar to those illustrated in FIG. 2. As in FIG. 2, subcooled reflux liquid 16 is directed into the motive inlet 46 of a mixing device 44; however, in this embodiment, the suction inlet 48 of the 44 receives a high proof fluid 82, such as a high proof vapor or a high proof liquid. The term "high proof" as used herein means a fluid (vapor and/or liquid) having the same minimum-boiling azeotropic constituent as the reflux liquid 16, but having a specific composition either more near the azeotrope than the reflux liquid 16, at the azeotrope, or preferably above the natural azeotrope. For the embodiment of a grain alcohol plant, the high proof fluid 82 may be an ethanol/water vapor or liquid sourced from a dehydration system 84 of the plant 80, or from another source. If the high proof fluid 82 is a vapor, the mixing device 44 may be a liquid jet eductor or similar device. If the high proof fluid 82 is a liquid, the mixing device 44 may be an eductor, a "liquid full" vessel such as a pipe or an inline mixer, a liquid full tank, or functionally similar device. As the reflux liquid 16 travels through the mixing device 44, the fluids are mixed together in the absence of a vapor/liquid equilibrium interface to produce a reflux mixture 56 that is more near the mixture's natural azeotrope than is the reflux liquid 16.

An advantage of the invention is the ability to further optimize the energy balance of the resulting integrated distillation-dehydration system. When the undesired component is removed from a minimum-boiling azeotropic mixture in the dehydration step, such as the removal of water from an ethanol water mixture, in combination with recycling part of the dehydrated high proof vapor or condensed dehydrated high proof liquid back into the reflux liquid, as described herein, there is a resultant overall lower cost in dollars, in energy, or in other value metric. This makes it possible to find an optimal recycle ratio which minimizes the total cost of the integrated distillation-dehydration system. Many dehydration process are extremely cost efficient; therefore, under many scenarios it is desirable to recycle more of the high proof fluid than would be desirable when the dehydration process is less cost efficient. This is particularly advantageous for existing plants which have inherent inefficiencies in their existing designs.

Numerous modifications and variations of this preferred embodiment may occur to those skilled in the art in light of this disclosure. Modifications may include one or more mixing devices in parallel or in series, or a combination of parallel units in series, used to educe one or more fluid streams from one or more sources. Intermediate heating or cooling steps, preferably cooling, may be added in order to optimize the quantity of vapor educed relative to the quantity of reflux liquid used. One or more booster pumps may be installed in order to increase the pressure of the reflux mixture 56 so that it has adequate pressure to function as the motive fluid in subsequent mixing devices in series. A combined embodiment may utilize both high proof vapor and high proof liquid as sources of high proof azeotropic material. While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An alcohol production plant comprising:
 a rectifier column wherein a water/alcohol mixture is directed through the rectifier column to produce an overhead vapor with an enriched alcohol content;
 a condenser wherein the overhead vapor is condensed to form a distillate;
 wherein a first portion of the distillate is recirculated to the rectifier column as a reflux liquid, and a second portion of the distillate is withdrawn as a distillate product; and further comprising:
 a source of a water/alcohol mixture having a higher alcohol content than the reflux liquid; and
 a mixing device in fluid communication with the reflux liquid and operable to inject the water/alcohol mixture having a higher alcohol content than the reflux liquid into the reflux liquid in the absence of a vapor/liquid equilibrium interface to form a reflux mixture,
 wherein the mixing device comprises an eductor comprising a motive inlet receiving the reflux liquid and a suction inlet receiving the water/alcohol mixture having a higher alcohol content than the reflux liquid, and
 wherein the source of the water/alcohol mixture having a higher alcohol content than the reflux liquid comprises a fluid connection delivering a portion of the distillate from a point which is downstream of the condenser and is upstream of a liquid side of a distillate collection vessel to the suction inlet in the form of a distillate vapor.

2. The alcohol production plant of claim 1, further comprising the alcohol production plant being a grain alcohol plant.

3. A system for use in an alcohol production plant wherein a water/alcohol mixture is directed through a rectifier column to produce an overhead vapor with an enriched alcohol content, and the overhead vapor is condensed in a condenser to form a distillate, with a first portion of the distillate being recirculated to the rectifier column as a reflux liquid, and a second portion of the distillate being withdrawn as a distillate product, the system comprising:
 a source of a water/alcohol mixture having a higher alcohol content than the reflux liquid; and
 a mixing device in fluid communication with the reflux liquid and operable to inject the water/alcohol mixture having a higher alcohol content than the reflux liquid into the reflux liquid in the absence of a vapor/liquid equilibrium interface to form a reflux mixture;
 and further comprising:
 a distillate collection vessel receiving the distillate from the condenser; and
 a conduit providing the reflux liquid from a liquid side of the distillate collection vessel to the mixing device,
 wherein the source of the water/alcohol mixture having a higher alcohol content than the reflux liquid comprises a conduit providing a fluid to the mixing device from a point downstream of the condenser and upstream of the liquid side of the distillate collection vessel.

4. The system of claim 3, wherein the alcohol production plant is a grain alcohol plant.

* * * * *